United States Patent
Ni et al.

(10) Patent No.: US 12,542,923 B2
(45) Date of Patent: Feb. 3, 2026

(54) METHOD AND APPARATUS FOR DOWN-SAMPLING AND UP-SAMPLING IN MATRIX INTRA PREDICTION FOR VIDEO

(71) Applicant: Samsung Electronics Co., Ltd., Suwon-si (KR)

(72) Inventors: Saifeng Ni, Santa Clara, CA (US); Madhukar Budagavi, Plano, TX (US); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 18/402,569

(22) Filed: Jan. 2, 2024

(65) Prior Publication Data

US 2025/0119575 A1 Apr. 10, 2025

Related U.S. Application Data

(60) Provisional application No. 63/548,501, filed on Nov. 14, 2023, provisional application No. 63/543,604, (Continued)

(51) Int. Cl.
*H04N 19/59* (2014.01)
*G06T 5/10* (2006.01)
(Continued)

(52) U.S. Cl.
CPC .............. *H04N 19/59* (2014.11); *G06T 5/10* (2013.01); *H04N 19/117* (2014.11);
(Continued)

(58) Field of Classification Search
CPC ... H04N 19/105; H04N 19/159; H04N 19/593
See application file for complete search history.

(56) References Cited

U.S. PATENT DOCUMENTS 11,218,706 B2 * 1/2022 Rath ................... H04N 19/167
11,277,637 B2 * 3/2022 Van der Auwera .... H04N 19/59
(Continued)

OTHER PUBLICATIONS

Intra Prediction and Mode Coding in VVC; Pfaff—Oct. 2021; (Year: 2021).*

(Continued)

*Primary Examiner* — Luis Perez-Fuentes

(57) ABSTRACT

An apparatus includes a communication interface configured to receive a bitstream for a compressed video and a processor operably coupled to the communication interface. The processor is configured to decode the bitstream for the compressed video and obtain reference samples associated with a block of a video frame. The processor is also configured to select a down-sampling filter to use in down-sampling the reference samples. The processor is also configured to apply the selected down-sampling filter to the reference samples to obtain reduced reference samples. The processor is also configured to obtain a reduced intra prediction associated with the block using the reduced reference samples. The processor is also configured to select an up-sampling filter to use in up-sampling the reduced intra prediction. The processor is also configured to apply the selected up-sampling filter to the reduced intra prediction to obtain a full intra prediction of the block.

20 Claims, 10 Drawing Sheets

Related U.S. Application Data filed on Oct. 11, 2023, provisional application No. 63/542,919, filed on Oct. 6, 2023.

(51) Int. Cl.
*H04N 19/117* (2014.01)
*H04N 19/159* (2014.01)
*H04N 19/184* (2014.01)
*H04N 19/80* (2014.01)

(52) U.S. Cl.
CPC ......... *H04N 19/159* (2014.11); *H04N 19/184* (2014.11); *H04N 19/80* (2014.11)

(56) References Cited

U.S. PATENT DOCUMENTS

| | | | | |
|---|---|---|---|---|
| 11,438,579 | B2 * | 9/2022 | Heo | H04N 19/132 |
| 11,438,610 | B2 * | 9/2022 | Da Silva Pratas Gabriel | H04N 19/70 |
| 11,457,221 | B2 * | 9/2022 | Salehifar | H04N 19/105 |
| 11,463,729 | B2 * | 10/2022 | Deng | H04N 19/132 |
| 11,546,633 | B2 * | 1/2023 | Deng | H04N 19/91 |
| 11,589,057 | B2 * | 2/2023 | Salehifar | H04N 19/593 |
| 11,659,185 | B2 * | 5/2023 | Deng | H04N 19/132 375/240.02 |
| 11,729,393 | B2 * | 8/2023 | Salehifar | H04N 19/132 375/240.12 |
| 11,843,786 | B2 * | 12/2023 | Salehifar | H04N 19/132 |
| 11,973,952 | B2 * | 4/2024 | Zhang | H04N 19/132 |

OTHER PUBLICATIONS

Data driven intra prediction modes in vvc coding standard; Pfaff—2020; (Year: 2020).*
Intra prediction modes based on neural networks; Pfaff—2018; (Year: 2018).*
Pfaff et al., "Intra Prediction and Mode Coding in VVC," IEEE Transactions on Circuits and Systems for Video Technology, vol. 31, No. 10, Oct. 2021, 14 pages.

* cited by examiner

METHOD AND APPARATUS FOR DOWN-SAMPLING AND UP-SAMPLING IN MATRIX INTRA PREDICTION FOR VIDEO

CROSS-REFERENCE TO RELATED APPLICATION AND PRIORITY CLAIM

This application claims priority under 35 U.S.C. § 119 (e) to U.S. Provisional Patent Application No. 63/542,919 filed on Oct. 6, 2023, U.S. Provisional Patent Application No. 63/543,604 filed on Oct. 11, 2023, and U.S. Provisional Patent Application No. 63/548,501 filed on Nov. 14, 2023, which are hereby incorporated by reference in their entirety.

TECHNICAL FIELD

This disclosure relates generally to multimedia devices and processes. More specifically, this disclosure relates to a method and apparatus for down-sampling and up-sampling in matrix intra prediction for video.

BACKGROUND

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included in a given device is increasing. Even with the increase of processing power, portable electronic devices often struggle to provide the processing capabilities to handle new services and applications, as newer services and applications often require more resources that is included in a portable electronic device. Thus, improved methods and apparatus for configuring and deploying media processing in the network are needed.

SUMMARY

This disclosure provides a method and apparatus for down-sampling and up-sampling in matrix intra prediction for video.

In a first embodiment, an apparatus includes a communication interface configured to receive a bitstream for a compressed video and a processor operably coupled to the communication interface. The processor is configured to decode the bitstream for the compressed video and obtain reference samples associated with a block of a video frame. The processor is also configured to select a down-sampling filter to use in down-sampling the reference samples. The processor is also configured to apply the selected down-sampling filter to the reference samples to obtain reduced reference samples. The processor is also configured to obtain a reduced intra prediction associated with the block using the reduced reference samples. The processor is also configured to select an up-sampling filter to use in up-sampling the reduced intra prediction. The processor is also configured to apply the selected up-sampling filter to the reduced intra prediction to obtain a full intra prediction of the block. The processor is also configured to output the full intra prediction of the block.

In a second embodiment, a method includes receiving and decoding a bitstream for a compressed video. The method also includes obtaining reference samples associated with a block of a video frame. The method also includes selecting a down-sampling filter to use in down-sampling the reference samples. The method also includes applying the selected down-sampling filter to the reference samples to obtain reduced reference samples. The method also includes obtaining a reduced intra prediction associated with the block using the reduced reference samples. The method also includes selecting an up-sampling filter to use in up-sampling the reduced intra prediction. The method also includes applying the selected up-sampling filter to the reduced intra prediction to obtain a full intra prediction of the block. The method also includes outputting the full intra prediction of the block.

In a third embodiment, an apparatus includes a communication interface and a processor operably coupled to the communication interface. The processor is configured to subdivide a video frame into a plurality of blocks of a plurality of block sizes. The processor is also configured to obtain reference samples associated with a block of the plurality of blocks. The processor is also configured to select a down-sampling filter to use in down-sampling the reference samples. The processor is also configured to apply the selected down-sampling filter to the reference samples to obtain reduced reference samples. The processor is also configured to obtain a reduced intra prediction associated with the block using the reduced reference samples. The processor is also configured to select an up-sampling filter to use in up-sampling the reduced intra prediction. The processor is also configured to apply the selected up-sampling filter to the reduced intra prediction to obtain a full intra prediction of the block. The processor is also configured to transmit an encoded prediction residual as part of a bitstream, wherein the prediction residual is a difference between an original block and a predicted block.

In a fourth embodiment, a method includes subdividing a video frame into a plurality of blocks of a plurality of block sizes. The method also includes obtaining reference samples associated with a block of the plurality of blocks. The method also includes selecting a down-sampling filter to use in down-sampling the reference samples. The method also includes applying the selected down-sampling filter to the reference samples to obtain reduced reference samples. The method also includes obtaining a reduced intra prediction associated with the block using the reduced reference samples. The method also includes selecting an up-sampling filter to use in up-sampling the reduced intra prediction. The method also includes applying the selected up-sampling filter to the reduced intra prediction to obtain a full intra prediction of the block. The method also includes transmitting an encoded prediction residual as part of a bitstream, wherein the prediction residual is a difference between an original block and a predicted block.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
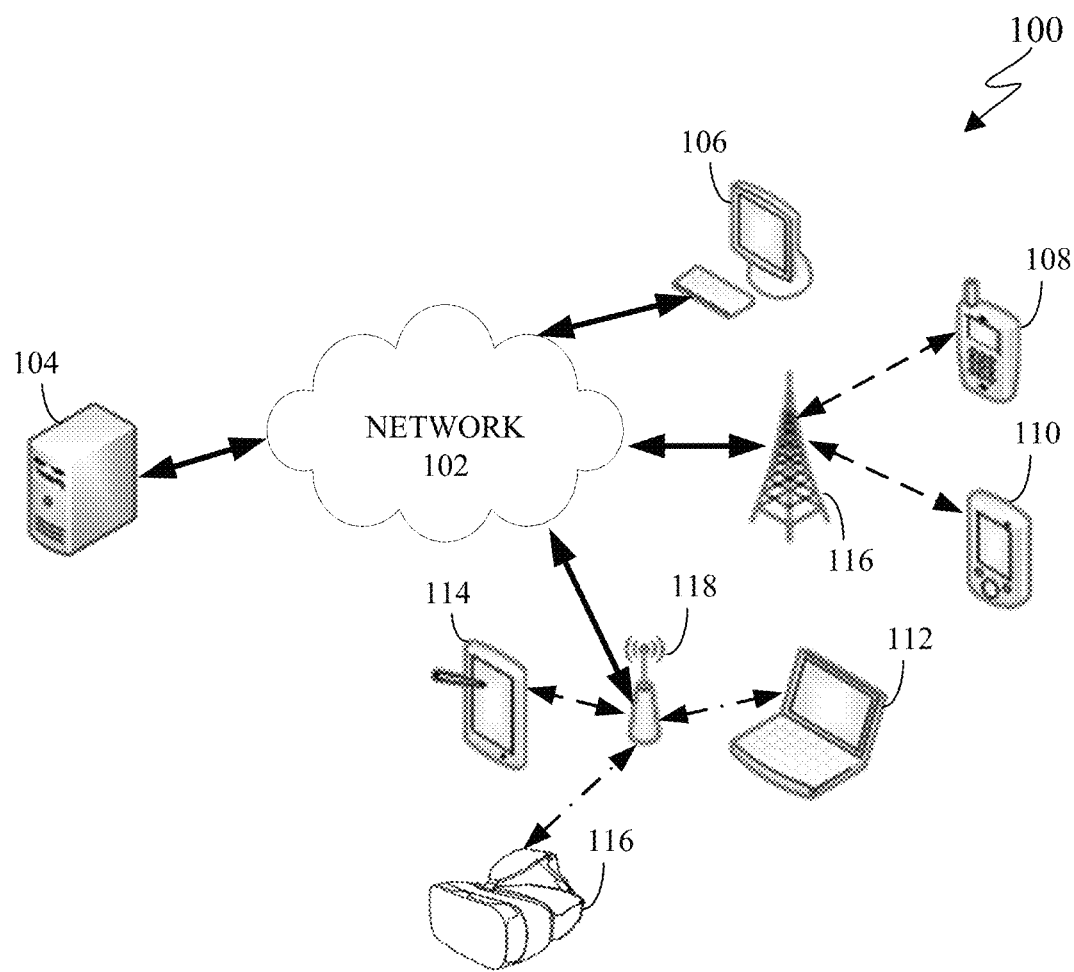
FIG. 1 illustrates an example communication system in accordance with this disclosure.

FIGS. 1 through 10, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, the use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included in a given device is increasing. Even with the increase of processing power, portable electronic devices often struggle to provide the processing capabilities to handle new services and applications, as newer services and applications often require more resources that is included in a portable electronic device. Thus, improved methods and apparatus for configuring and deploying media processing in the network are needed.

Cloud media processing is gaining traction where media processing workloads are setup in the network (e.g., cloud) to take advantage of advantages of the benefits offered by the cloud such as (theoretically) infinite compute capacity, auto-scaling based on need, and on-demand processing. An end user client can request a network media processing provider for provisioning and configuration of media processing functions as required.

Media processing can include using intra prediction in video coding to exploit spatial correlation within a picture or within a picture region. For example, in order to improve coding efficiency, the High-Efficiency Video Coding (HEVC) standard and Versatile Video Coding (VVC) standard exploit block-based spatial prediction. Intra prediction in video coding standards such as Advanced Video Coding (AVC) and HEVC consist of predicting the samples in the current block from already reconstructed left and top neighboring samples, referred to as reference samples. In VVC, multiple intra prediction modes are used to exploit spatial features.

In VVC, the number of directional modes was increased from 33 (in HEVC) to 65 with block shape-adaptive directions. The size of a Prediction Unit (PU) for intra prediction coding can be 1×16, 1×32, 2×8, 2×16, 2×32, 4×4, 4×8, 4×16, 4×32, 8×8, 8×16, 8×32, 16×16, 16×32, 16×64, 32×32, 64×64. VVC can also use a partitioning framework by introducing wide-angular intra prediction modes which can deal with blocks with rectangular shape, where more prediction directions are assigned to the longer side of a block. The additional modes on the longer side are called Wide-Angle Intra Prediction (WAIP) mode.

Similar to HEVC, intra prediction in VVC has two filtering mechanisms applied on reference samples, including reference sample smoothing and interpolation filtering. Reference sample smoothing is applied only to integer-slope mode for luma blocks while interpolation filtering is applied on fractional-slope mode. 4-tap interpolation filters can be used for luma blocks. In some embodiments of this disclosure, the 4-tap interpolation filter can be a discrete cosine transform (DCT)-based interpolation filter (DCTIF) or a 4-tap smoothing interpolation filter (SIF).

Matrix-based intra prediction (MIP) can also be used to perform block-based predictions. However, in existing approaches, when MIP is used for intra prediction for a block, regardless of the particular features of the block, averaging is used to down-sample the reference samples to a reduced size, and linear interpolation is used to up-sample a reduced prediction to get a full prediction. Thus, current down-sampling and up-sampling for MIP tends to be inefficient.

This disclosure provides for improved coding efficiency for matrix-based intra prediction (MIP) by using improved down-sampling and up-sampling schemes for MIP. Embodiments of this disclosure provide for selection of other filter candidates for both down-sampling and up-sampling than just averaging for down-sampling or linear interpolation for up-sampling. Embodiments of this disclosure also provide for effective filter schemes such as using block-feature-based decision making schemes that determine which filter to choose for a block. For instance, when the data of a block has a smooth pattern, averaging for down-sampling and linear interpolation for up-sampling can be used, but, when a block contains large variations, e.g., sharp edge features, other down-sampling and up-sampling filters can be selected to provide for enhanced efficiency. In various embodiments of this disclosure, the variation of the reference samples thus is used to determine which down-sampling or up-sampling filters to use for a block to substantially improve coding efficiency.

For example, it has been found that a coding efficiency gain of about 0.09% (Y) in All Intra mode can be achieved for the YUV color format. Embodiments of this disclosure also provide for data-driven based filter optimization, where the down-sampling and up-sampling filters are optimized directly based on data to reduce the prediction residual. With such optimized filters, it has been found that a coding efficiency gain of about 0.09% (Y) can be achieved. Additionally, if adaptive filter weights are used for different video resolutions, it has been found that a coding efficiency gain of about 0.11% (Y) in All Intra mode can be achieved.

FIG. 1 illustrates an example communication system 100 in accordance with this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a compressed video to one or more display devices, such as a client device 106-116. In certain embodiments, each server 104 can include an encoder. In certain embodiments, the server 104 can perform compression/decompression and signaling of video and of information related to block intra prediction, such as including a prediction residual in the bitstream, as described in this disclosure.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including video. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate video data, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress video data, generate a bitstream that represents the video data, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create video data, compress video data, transmit video data, receive video data, decode video data, render video data, perform intra prediction, or a combination thereof. For example, the server 104 can compress a video to generate a bitstream and then transmit the bitstream to one or more of the client devices 106-116. As another example, one of the client devices 106-116 can compress a video to generate a bitstream and then transmit the bitstream to another one of the client devices 106-116 or to the server 104. In accordance with this disclosure, the server 104 and/or the client devices 106-116 can perform compression/decompression of video, including performing intra prediction using customized and/or optimized down-sampling and/or up-sampling filters and related signaling as described in this disclosure.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
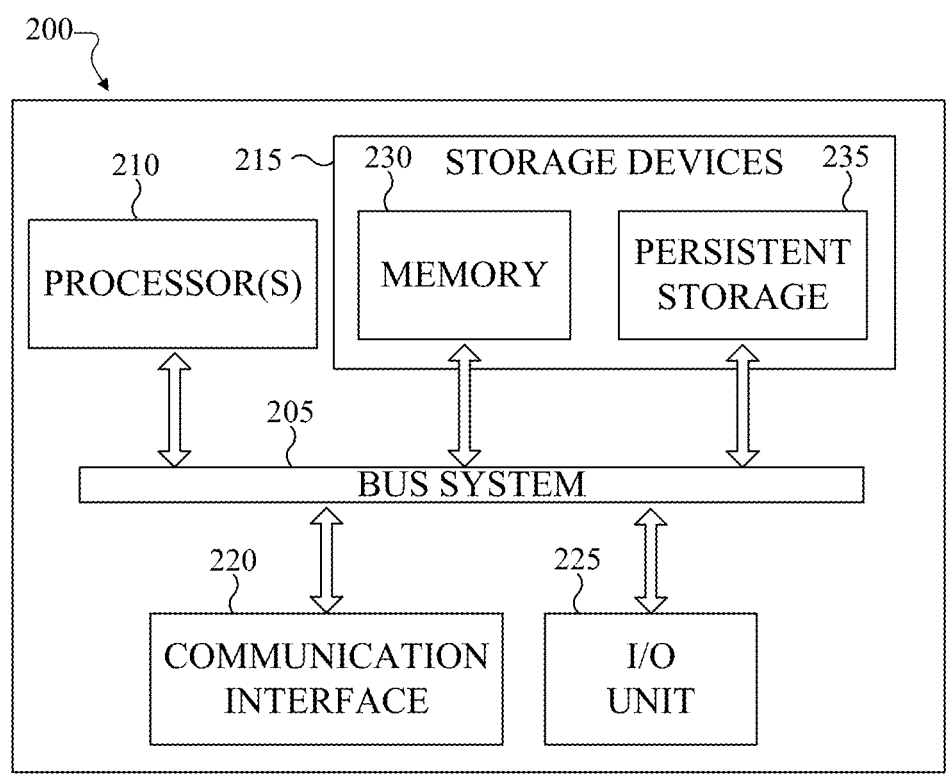
FIGS. 2 and 3 illustrate example electronic devices in accordance with this disclosure.
Figure 3:
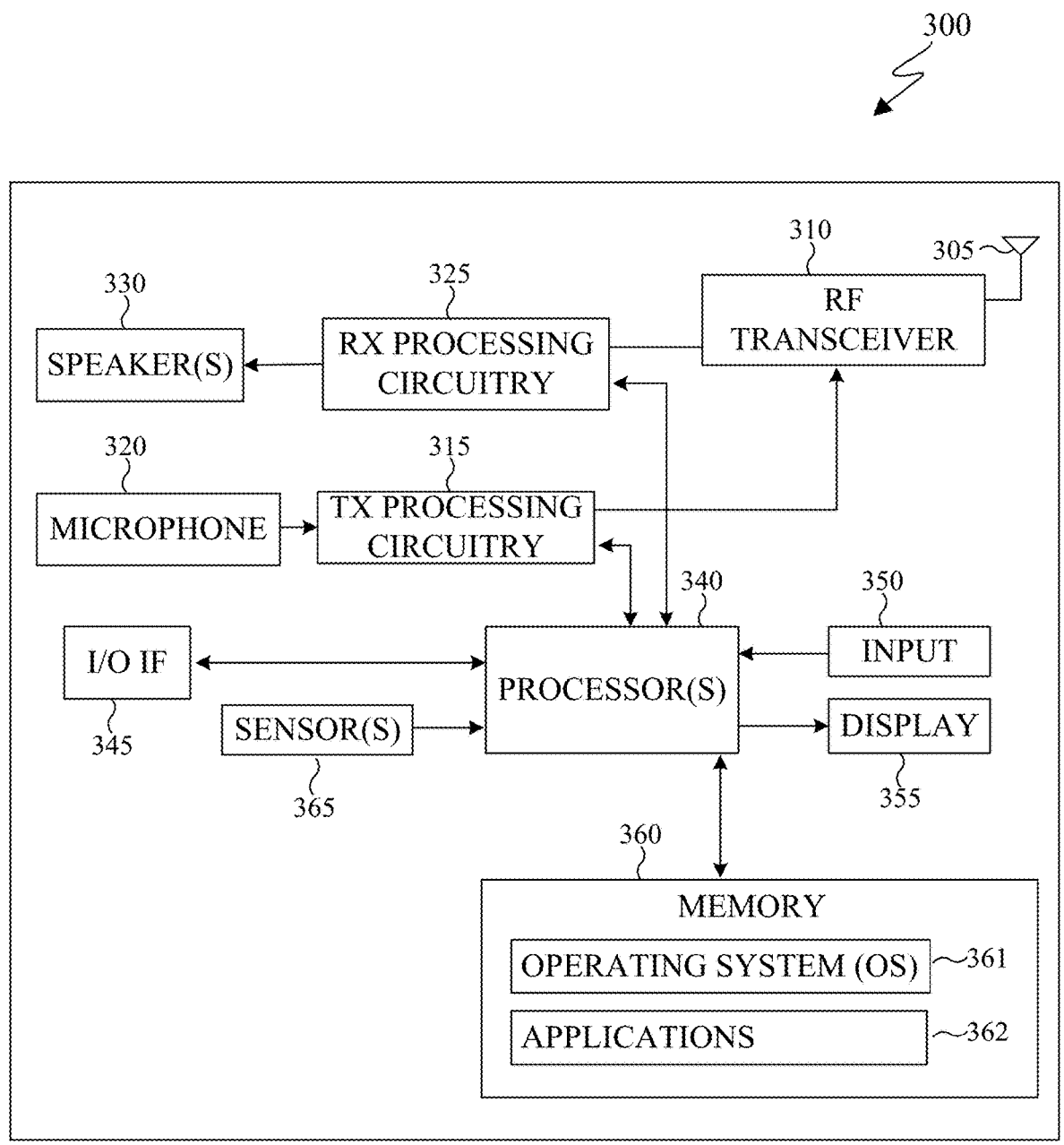

FIGS. 2 and 3 illustrate example electronic devices in accordance with this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode video stored within the storage devices 215, including performing block-based intra prediction using customized and/or optimized down-sampling and/or up-sampling filters. In certain embodiments, encoding video can include subdividing a video frame into a plurality of blocks of a plurality of block sizes, obtaining reference samples associated with a block of the plurality of blocks, selecting a down-sampling filter to use in down-sampling the reference samples, applying the selected down-sampling filter to the reference samples to obtain reduced reference samples, obtaining a reduced intra prediction associated with the block using the reduced reference samples, selecting an up-sampling filter to use in up-sampling the reduced intra prediction, applying the selected up-sampling filter to the reduced intra prediction to obtain a full intra prediction of the block, and transmitting an encoded prediction residual as part of a bitstream. A prediction residual represents a difference between an original block and a predicted block. In certain embodiments, the processor 210 can perform such compression/decompression and signaling of the video and information for intra prediction as described in this disclosure.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for performing block-based intra prediction using customized and/or optimized down-sampling and/or up-sampling filters, instructions for compressing 2D video frames, as well as instructions for encoding 2D video frames in a certain order in order to generate a bitstream. The instructions stored in the memory 230 can also include instructions for rendering the video as viewed through a VR headset, such as HMD 116 of FIG. 1. The instructions stored in the memory 230 can also include instructions for compression/decompression and signaling of video as described in this disclosure. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing video to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can perform block-based intra prediction using customized and/or optimized down-sampling and/or up-sampling filters, and compression/decompression and signaling of video as described in this disclosure.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can also display decoded video data.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, volumetric multiview video, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

One or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generating a virtual object or capturing (or recording) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
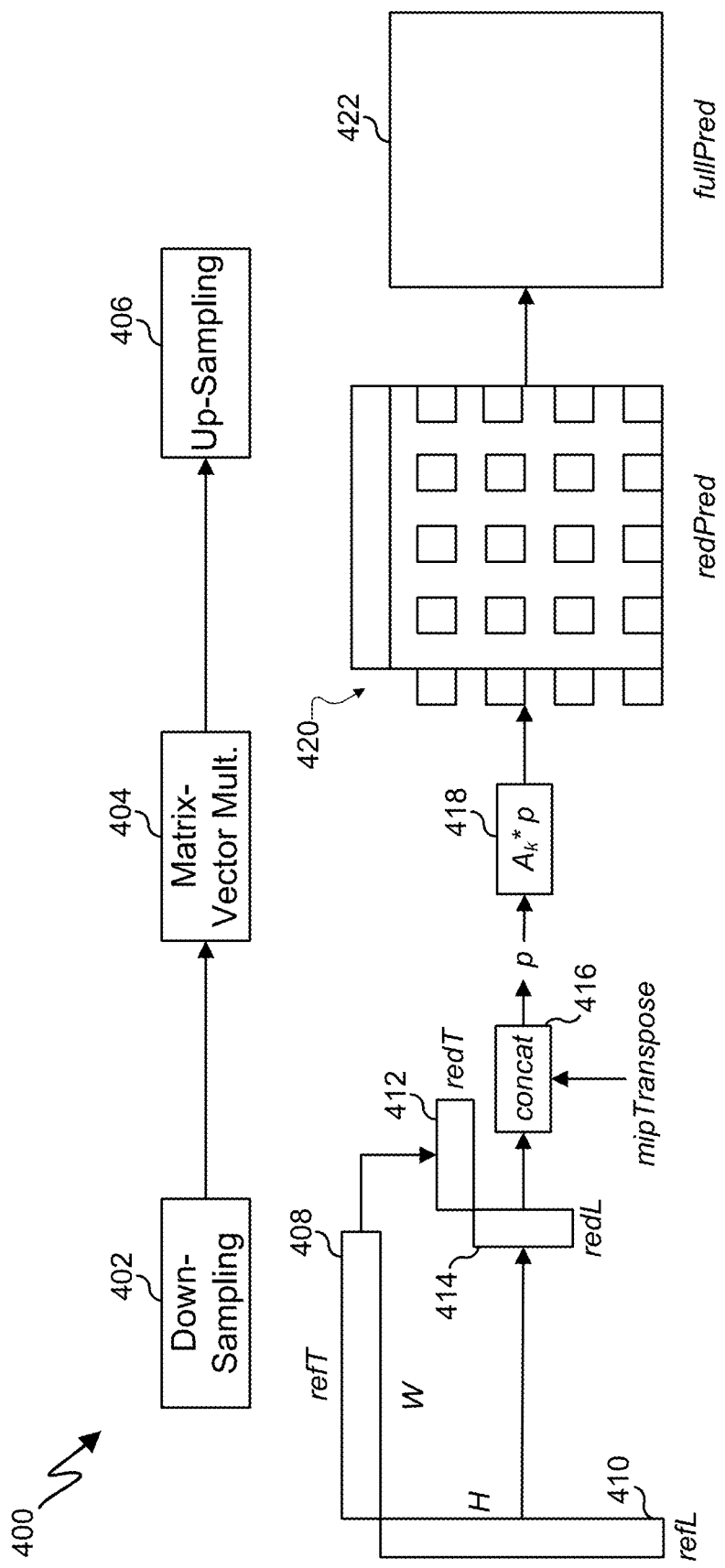
FIG. 4 illustrates an example matrix-based intra prediction process in accordance with this disclosure.

FIG. 4 illustrates an example matrix-based intra prediction process 400 in accordance with this disclosure. For ease of explanation, the process 400 of FIG. 4 may be described as being performed using the electronic device 300 of FIG. 3. However, the process 400 may be used with any other suitable system and any other suitable electronic device.

During encoding, a video frame can be subdivided into a plurality of blocks of various block sizes. Intra prediction is performed to predict, using known reference samples from a block, a prediction of a full block for the video frame. The reference boundary is reduced to 2 for a 4×4 block and to 4 for other block sizes. The Matrix-based Intra Prediction (MIP) mode is a data-driven method of intra prediction. As shown in FIG. 4, there are three overarching steps to perform MIP. The first step is a reference sample down-sampling step 402, where a top reference sample 408 (refT) and a left reference sample 410 (refL) are reduced to a smaller size. The down-sampling results in a reduced top reference sample 412 (redT) and a reduced left reference sample 414 (redL). The length of redT and redL can depend on a mipSizeId which is inferred from the block width W and height H. Existing approaches use the averaging of reference samples for the down-sampling process.

As shown in FIG. 4, a concatenation operation 416 concatenates the redT and redL into a vector (p) based on a mipTranspose flag. After the two reduced boundary samples are concatenated and transformed based on the mipTranspose flag, the second step involves performing matrix-vector multiplication 404. A matrix-vector multiplication operation 418 is performed, which can be based on the mipSizeId and a MIP-mode k.

For the matrix-vector multiplication, each matrix $A_k$ is uniquely determined by the mipSizeId and by the MIP-mode k. Its entries can be represented using 7-bit precision. For mipSizeId=2, the first column of each matrix $A_k$ is zero since the corresponding MIP mode maps the constant boundary signal to the constant prediction signal of the same value. Thus, overall, 16 matrices of size 16×4, used for mipSizeId=0, 8 matrices of size 16×8, used for mipSizeId=1, and 6 matrices of size 64×7, used for mipSizeId=2, can be utilized with MIP. With the additional indicator mipTranspose, the actual number of modes for each mipSizeId is doubled. The mode-k of a MIP block is searched in the encoder and signaled in the decoder. After the matrix and vector multiplication, a reduced prediction 420 (redPred) is generated. The reduced prediction size is 4×4 for mipSizeId=0 and 1 and 8×8 for mipSizeId=2. The last step involves performing up-sampling 406. The up-sampling 406 can include two rounds of up-sampling, a horizontal round and a vertical round, to up-sample the reduced prediction 420 to a full prediction 422. Existing approaches use linear interpolation for the up-sampling process.

Intra prediction, including matrix-based intra prediction, is further described in Pfaff et al., "Intra Prediction and Mode Coding in VVC," IEEE Transactions on Circuits and Systems for Video Technology, Vol. 31, No. 10, October 2021 (available at https://ieeexplore.ieee.org/document/9400392), which is hereby incorporated by reference in its entirety.

A prediction can thus be generated using the neighboring samples and a corresponding prediction residual signal can be obtained, where the prediction residual is a difference between an original block and a predicted block. The residual can then be transformed and quantized and the transform coefficients are entropy coded and sent to the decoder. The resulting reconstructed samples can be employed to generate a next prediction. This procedure can continue until all blocks are predicted and have been coded.

Although FIG. 4 illustrates one example matrix-based intra prediction process 400, various changes may be made to FIG. 4. For example, while shown as a series of steps, various steps in FIG. 4 may overlap, occur in parallel, or occur any number of times. In addition, as further described in this disclosure, the down-sampling and up-sampling processes can be customized and/or optimized for improved coding efficiency.

As described above, while matrix-based intra prediction (MIP) can be used to perform intra predictions, averaging is used to down-sample the reference samples to a reduced size, and linear interpolation is used to up-sample a reduced prediction to get a full prediction, regardless of the particular features of the block. Thus, current down-sampling and up-sampling for MIP tends to be inefficient and does not effectively take into account block features.

Figure 5:
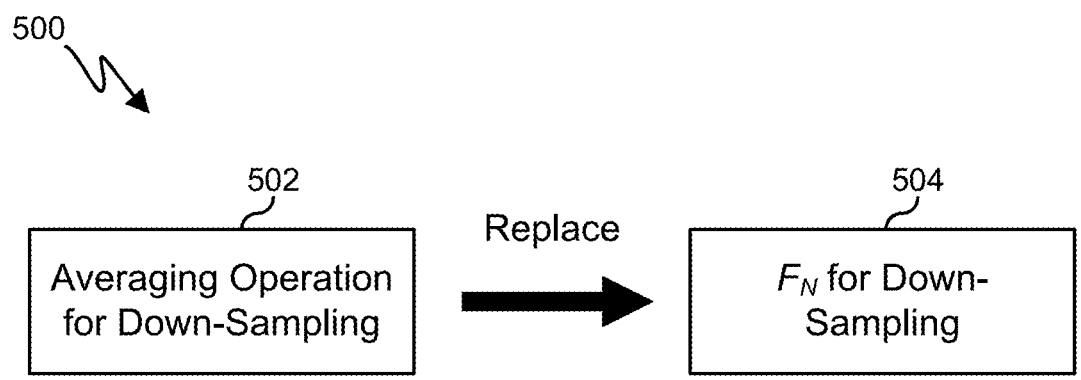
FIG. 5 illustrates an example process for window-based filter down-sampling in accordance with this disclosure.

FIG. 5 illustrates an example process 500 for window-based filter down-sampling in accordance with this disclosure. For ease of explanation, the process 500 of FIG. 5 may be described as being performed using the electronic device 300 of FIG. 3. However, the process 500 may be used with any other suitable system and any other suitable electronic device.

As shown in FIG. 5, an averaging operation 502 for MIP reference sample down-sampling is replaced by an optimized filter 504 ($F_N$) for MIP reference sample down-sampling. In MIP, the down-sampling factor for MipSizeId=0 is 2 (i.e. from 4 to 2), the down-sampling factors for MipSizeId=1 are 2, 4 and 8, and the down-sampling factors for MipSizeId=2 are 2, 4, 8 and 16. The down-sampling filter can be a low pass anti-aliasing filter. When creating a down-sampling filter with a decimation factor N and assuming the sampling rate is $f_s$, the cutoff frequency of the low pass filter is $f_s/2N$. Thus, a window-based finite impulse response (FIR) filter can be used to create low pass filters with different decimation factors. In various embodiments, the number of taps can be set to be the same as the decimation factor N.

The design of the low pass filter is similar for other numbers of taps. In various embodiments, different window functions can also be used to create the FIR filters including Lanczo, Kaiser, Parks-McClellan Remez and so on. The process 500 includes generating a set of candidate filters based on different window functions and related parameters for each decimation factor N. In some embodiments, a best two filters for each decimation factor are identified and an optimal combination of those filters are determined. For example, it has been found that the following combination of filters can provide optimal improved performance, where $F_2$=[1,1], $F_4$=[20,44,44,20], $F_8$=[4,12,21,27,27,21,12,4], $F_{16}$=[2,3,5,7,9,11,13,14,14,13,11,9,7,5,3,2]. Thus, as shown in FIG. 5, instead of using averaging for down-sampling of reference samples, the $F_N$ filter can be used instead for down-sampling to improve efficiency.

Although FIG. 5 illustrates an example process 500 for window-based filter down-sampling, various changes may be made to FIG. 5. For example, although FIG. 5 shows an averaging down-sampling operation being replaced, in various embodiments, window-based filters could simply be used as the default down-sampling filter type.

Figure 6:
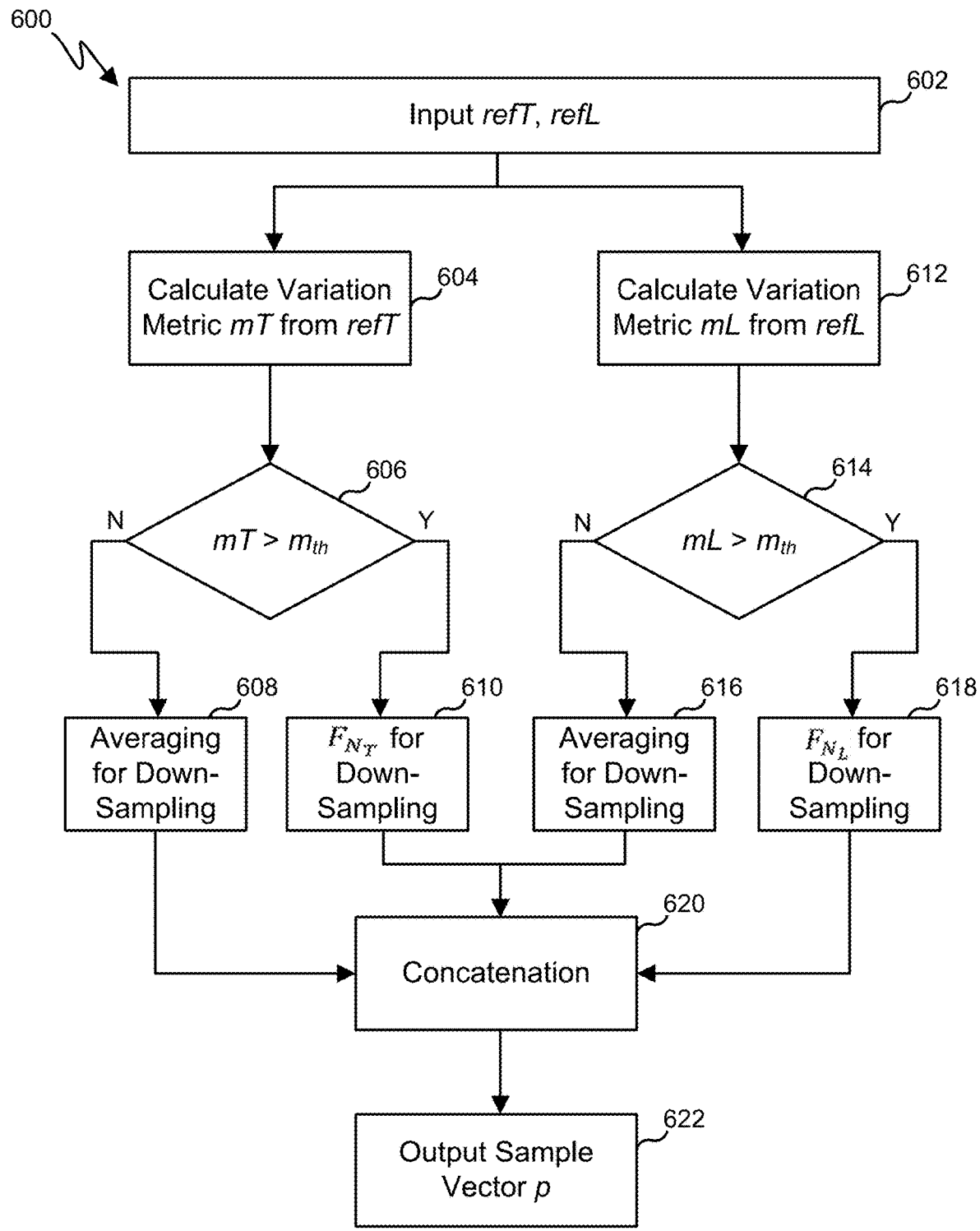
FIG. 6 illustrates an example process for block-based reference sample down-sampling optimization in accordance with this disclosure.

FIG. 6 illustrates an example process 600 for block-based reference sample down-sampling optimization in accordance with this disclosure. For ease of explanation, the process 600 of FIG. 6 may be described as being performed using the electronic device 300 of FIG. 3. However, the process 600 may be used with any other suitable system and any other suitable electronic device.

As shown in FIG. 6, at step 602, the electronic device 300 obtains as an input a top reference sample (refT) and a left reference sample (refL) for a block. The particular block partition scheme used may split blocks into various sizes including 1×16, 1×32, 2×8, 2×16, 2×32, 4×4, 4×8, 4×16, 4×32, 8×8, 8×16, 8×32, 16×16, 16×32, 16×64, 32×32, 64×64 and some of their transpositions, and different blocks can have unique features. In some embodiments, instead of replacing the averaging filter with $F_N$, such as described with respect to FIG. 5, rules to determine which filter to use for down-sampling based on block features can be used. For example, as shown in FIG. 6, a variation metric for the reference samples can be used to determine the type of down-sampling filter to use.

Assume the reference samples is refV. In various embodiments, a variance of the reference samples var(refV) or the smoothness of the reference samples (smooth(refV)=var(diff(refV)) is used as metric to determine which filter to use. If var(refV)>varTh, where varTh is the threshold for the variance metric, then a window-based filter $F_N$ is chosen, such as described with respect to FIG. 5. Otherwise, the averaging filter is used. Similarly, if smooth(refV) >smoothTh, where smoothTh is the threshold for the smoothness metric, then $F_N$ is chosen. Otherwise, the averaging filter is used. Generally, when the data of a block has a smooth pattern, averaging for down-sampling and linear interpolation for up-sampling can be used, but, when a block contains large variations, e.g., sharp edge features, other down-sampling filters can be selected to provide for enhanced efficiency.

For example, as shown in FIG. 6, at step 604, a variation metric mT is calculated using the top reference sample, refT. At step 606, the electronic device 300 determines whether the variation metric mT is greater than a metric threshold ($m_{th}$). If not, at step 608, averaging is used to down-sample the top reference sample. If, at step 606, the electronic device 300 determines that the variation metric mT is greater than a metric threshold ($m_{th}$), then, at step 610, a window-based filter for the top reference sample ($F_{N_T}$) is used to down-sample the top reference sample.

At step 612, a variation metric mL is calculated using the left reference sample, refL. At step 614, the electronic device 300 determines whether the variation metric mL is greater than a metric threshold ($m_{th}$). If not, at step 616, averaging is used to down-sample the left reference sample. If, at step 614, the electronic device 300 determines that the variation metric mL is greater than a metric threshold ($m_{th}$), then, at step 618, a window-based filter for the left reference sample ($F_{N_L}$) is used to down-sample the left reference sample.

As described with respect to FIG. 4, once both of the top reference sample and left reference sample have been down-sampled at one of steps 608, 610 and at one of steps 616, 618, reduced top and left reference samples, redT and redL, are obtained. At step 620, the reduced top and left reference samples are concatenated to create a sample vector p. At step 622, the sample vector p is output by the electronic device for further use in matrix-based intra prediction. For example, as described with respect to FIG. 4, the sample vector p can be used in a matrix-vector multiplication operation to create a reduced prediction (redPred).

Example coding gains when using an adaptive threshold based on variance (varTh) for down-sampling is shown in Table 1.

TABLE 1

Example Coding performance for adaptive down-sampling filter using variance metric

| | All Intra Main10 Over VTM-19.2 | | |
|---|---|---|---|
| | Y | U | V |
| Class A1 | −0.01% | −0.36% | −0.10% |
| Class A2 | −0.03% | 0.13% | 0.05% |
| Class B | −0.03% | 0.05% | −0.03% |
| Class C | 0.02% | −0.10% | 0.10% |
| Class E | −0.02% | 0.08% | −0.45% |
| Overall | −0.02% | −0.03% | −0.07% |
| Class D | −0.04% | 0.18% | −0.34% |
| Class F | −0.12% | 0.38% | −0.02% |

Example coding gains when using an adaptive threshold based on smoothness (smoothTh) for down-sampling is shown in Table 2.

TABLE 2

Example Coding performance for adaptive down-sampling filter using smoothness metric

| | All Intra Main10 Over VTM-19.2 | | |
|---|---|---|---|
| | Y | U | V |
| Class A1 | 0.00% | −0.17% | −0.10% |
| Class A2 | −0.02% | 0.21% | 0.11% |
| Class B | −0.05% | 0.01% | 0.35% |
| Class C | −0.02% | 0.04% | 0.03% |
| Class E | −0.01% | −0.01% | −1.04% |
| Overall | −0.02% | 0.02% | −0.07% |
| Class D | −0.03% | 0.00% | 0.22% |
| Class F | −0.08% | 0.24% | −0.15% |

Although examples are described above regarding using variance or smoothness metrics, it will be understood that other variation metrics can be used as well. For example, in some embodiments, adaptive thresholds can be set for video with different resolutions. For instance, $m_{th}$ in FIG. 6 can be different for different resolutions. If variance or smoothness are used as the variation metric, different varTh or smoothTh can be utilized for video with different resolutions. Other block-based metrics could also be utilized in the filter selection as well.

Example values for adaptive thresholding based on video resolution for down-sampling are provided in Table 3.

TABLE 3

Example Adaptive thresholds for down-sampling filter

| Video Res. | 3840 × 2160 | 1920 × 1080 | 834 × 480 | 416 × 240 | 1280 × 720 |
|---|---|---|---|---|---|
| varTh | 500 | 1000 | 5000 | 2000 | 2000 |
| smoothTh | 100 | 4000 | 10000 | 1000 | 500 |

Although FIG. 6 illustrates an example process 600 for block-based reference sample down-sampling optimization, various changes may be made to FIG. 6. For example, while shown as a series of steps, various steps in FIG. 6 may overlap, occur in parallel, or occur any number of times.

Figure 7:
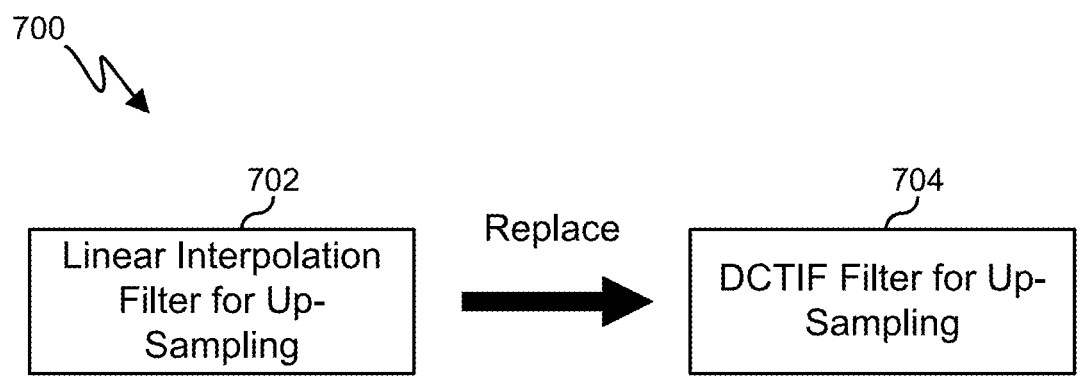
FIG. 7 illustrates an example process for discrete cosine transform interpolation filter (DCTIF) up-sampling in accordance with this disclosure.

FIG. 7 illustrates an example process 700 for discrete cosine transform interpolation filter (DCTIF) up-sampling in accordance with this disclosure. For ease of explanation, the process 700 of FIG. 7 may be described as being performed using the electronic device 300 of FIG. 3. However, the process 700 may be used with any other suitable system and any other suitable electronic device.

As shown in FIG. 7, a linear interpolation filter operation 702 for MIP reference sample up-sampling is replaced by an optimized DCTIF 704 for MIP reference sample up-sampling. In some embodiments, when up-sampling the reduced prediction (redPred) to a full prediction (fullPred) for a block in MIP, the up-sampling factor could be 2, 4 and 8. Replacing the linear interpolation filter with DCTIF filters as shown in FIG. 7 has been found to work well for up-sampling interpolation in MIP, especially for blocks with large variation.

Intra angular mode of intra prediction can also use DCTIF filters for reference sample interpolation, and thus the 4-tap DCTIF filters designed for reference sampling interpolation in angular mode can be used for the up-sampling of reference samples in MIP mode in some embodiments. In some embodiments, specialized DCT-based filters or other up-sampling filter types can be created and used for up-sampling in MIP mode.

Although FIG. 7 illustrates an example process 700 for DCTIF up-sampling, various changes may be made to FIG. 7. For example, although FIG. 7 shows a linear interpolation up-sampling operation being replaced, in various embodiments, DCTIF-based filters could simply be used as the default up-sampling filter type.

Figure 8:
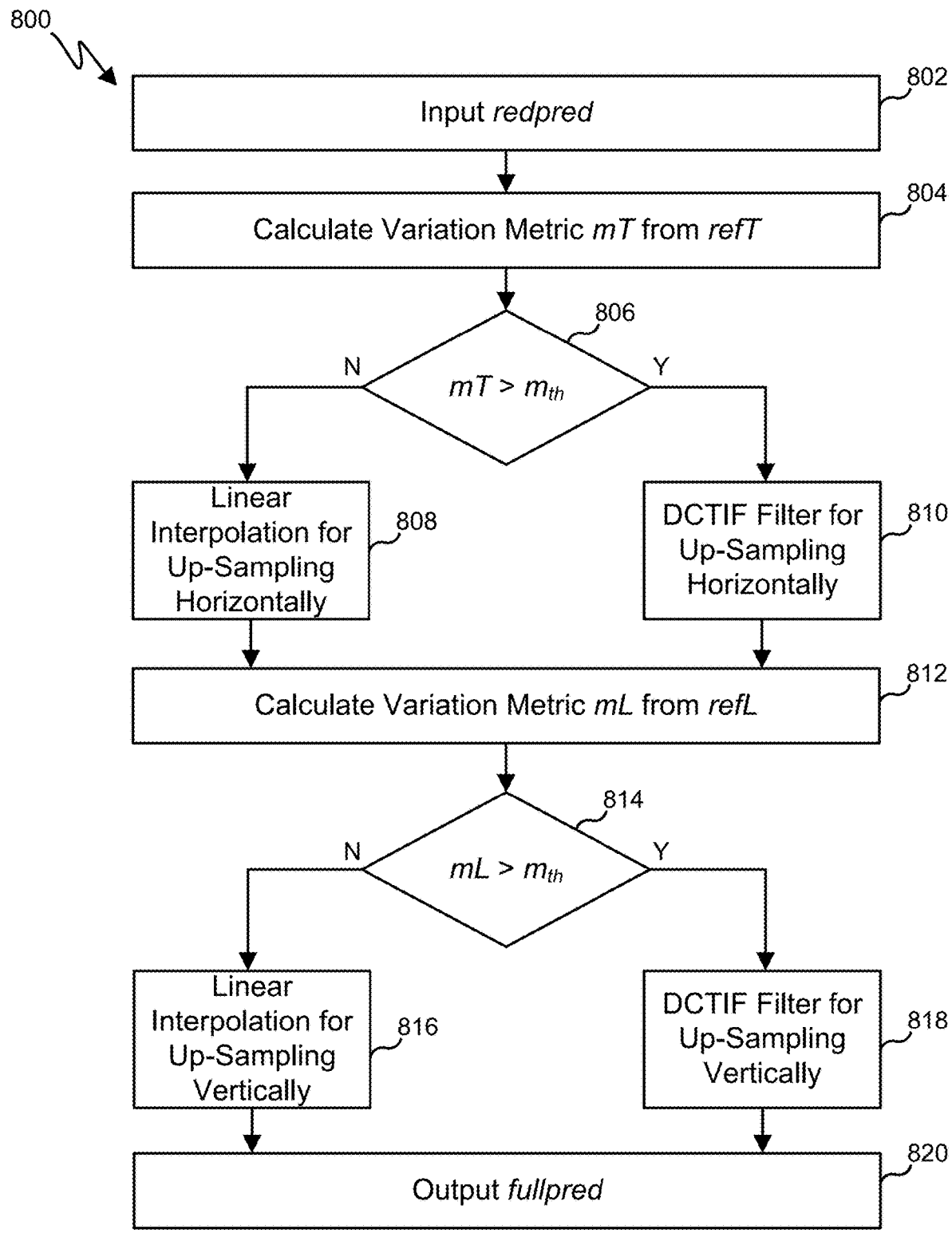
FIG. 8 illustrates an example process for block-based reference sample up-sampling optimization in accordance with this disclosure.

FIG. 8 illustrates an example process 800 for block-based reference sample up-sampling optimization in accordance with this disclosure. For ease of explanation, the process 800 of FIG. 8 may be described as being performed using the electronic device 300 of FIG. 3. However, the process 800 may be used with any other suitable system and any other suitable electronic device.

In some embodiments, such as described with respect to FIG. 7, the linear interpolation up-sampling of MIP could simply be replaced with a DCT-based interpolation filter. In some embodiments, however, a scheme to select between the linear interpolation filter and a DCT-based interpolation filter based on block features can be used to determine the up-sampling filter for MIP, as shown for example in FIG. 8. Here, similar to that described for the down-sampling filter with respect to FIG. 6, the variation of the reference samples, e.g., the variance and the smoothness, can be used as a metric to choose the filter type. If the variation is larger than a threshold, then the DCTIF filter is selected, otherwise, the linear interpolation can be selected. As described with respect to FIG. 7, the 4-tap DCTIF filters designed for reference sampling interpolation in angular mode could be used, or specialized DCT-based filters or other up-sampling filter types can be created and used for up-sampling in MIP mode.

For instance, as shown in FIG. 8, at step 802, the electronic device 300 obtains as an input a reduced prediction (redPred), e.g., a reduced prediction created after matrix-vector multiplication as described with respect to FIG. 4. At step 804, a variation metric mT is calculated using the top reference sample, refT. At step 806, the electronic device 300 determines whether the variation metric mT is greater than a metric threshold ($m_{th}$). If not, at step 808, a linear interpolation filter is used to up-sample the reduced prediction horizontally. If, at step 806, the electronic device 300 determines that the variation metric mT is greater than a metric threshold ($m_{th}$), then, at step 810, a DCT-based filter is used to up-sample the reduced prediction horizontally.

At step 812, a variation metric mL is calculated using the left reference sample, refL. At step 814, the electronic device 300 determines whether the variation metric mL is greater than a metric threshold ($m_{th}$). If not, at step 816, a linear interpolation filter is used to up-sample the reduced prediction vertically. If, at step 814, the electronic device 300 determines that the variation metric mL is greater than a metric threshold ($m_{th}$), then, at step 818, a DCT-based filter is used to up-sample the reduced prediction vertically. As described with respect to FIG. 4, once the reduced prediction is up-sampled both horizontally and vertically at one of steps 808, 810 and at one of steps 816, 818, a full prediction (fullPred) can be obtained and output by the electronic device at step 820.

Example coding gains when using an adaptive threshold based on variance (varTh) for up-sampling is shown in Table 4.

TABLE 4

Example Coding performance for adaptive up-sampling filter using variance metric

| | All Intra Main10 Over VTM-19.2 | | |
|---|---|---|---|
| | Y | U | V |
| Class A1 | −0.02% | −0.16% | −0.09% |
| Class A2 | −0.05% | −0.06% | 0.13% |
| Class B | −0.06% | 0.07% | −0.03% |
| Class C | −0.01% | −0.14% | 0.02% |
| Class E | −0.05% | 0.25% | −0.60% |
| Overall | −0.04% | −0.01% | −0.10% |
| Class D | −0.08% | 0.34% | 0.25% |
| Class F | −0.05% | 0.68% | −0.68% |

Example coding gains when using an adaptive threshold based on smoothness (smoothTh) for up-sampling is shown in Table 5.

TABLE 5

Example Coding performance for adaptive up-sampling filter using smoothness metric

| | All Intra Main10 Over VTM-19.2 | | |
|---|---|---|---|
| | Y | U | V |
| Class A1 | −0.03% | −0.26% | 0.14% |
| Class A2 | −0.07% | 0.06% | 0.09% |
| Class B | −0.07% | 0.04% | 0.32% |
| Class C | −0.03% | −0.09% | 0.08% |
| Class E | −0.06% | 0.31% | −0.35% |
| Overall | −0.05% | 0.01% | 0.09% |
| Class D | −0.07% | 0.36% | 0.01% |
| Class F | −0.08% | 0.41% | −0.02% |

Although examples are described above regarding using variance or smoothness metrics, it will be understood that other variation metrics can be used as well. For example, in some embodiments, adaptive thresholds can be set for video with different resolutions. For example, $m_{th}$ in FIG. 8 can be different for different resolutions. If variance or smoothness are used as the variation metric, different varTh or smoothTh can be utilized for video with different resolutions. Other block-based metrics could also be utilized in the decision making as well. Example values for adaptive thresholding based on video resolution for up-sampling are provided in Table 6.

TABLE 6

Example Adaptive thresholds for up-sampling filter

| Video Res. | 3840 × 2160 | 1920 × 1080 | 834 × 480 | 416 × 240 | 1280 × 720 |
|---|---|---|---|---|---|
| varTh | 10000 | 2000 | 5000 | 500 | 10000 |
| smoothTh | 400 | 100 | 200 | 1000 | 200 |

In some embodiments, instead of using the DCTIF filters used in intra angular mode for reference sample interpolation, the DCTIF filters can be generated based on DCT Type II (DCT-II). Example DCTIF-II filter weights are provided in Table 7.

TABLE 7

Example DCTIF Filter Weights Generated with DCT-II

| pel position | 4-tap DCTIF filter |
|---|---|
| 0 | 0, 64, 0, 0 |
| 1/8 | −4, 61, 8, −1 |
| 2/8 | −6, 56, 18, −4 |
| 3/8 | −7, 48, 28, −5 |
| 4/8 | −7, 39, 39, −7 |
| 5/8 | −6, 28, 48, −6 |
| 6/8 | −4, 18, 56, −6 |
| 7/8 | −2, 8, 61, −3 |
| 1 | 0, 0, 64, 0 |

In some embodiments, DCT-II filter weights and adaptive thresholds for video with different resolutions can be used. The adaptive thresholds for using both DCT-II filter weights and adaptive thresholds for video with different resolutions are provided in Table 8.

TABLE 8

Example Adaptive thresholds for up-sampling filter with DCT-II filter weights

| Video Res. | 3840 × 2160 | 1920 × 1080 | 834 × 480 | 416 × 240 | 1280 × 720 |
|---|---|---|---|---|---|
| varTh | 10000 | 2000 | 0 | 0 | 10000 |
| smoothTh | 200 | 300 | 0 | 0 | 100 |

Further improved coding gains can be achieved when using the DCT-II filter weights, such as shown in Table 9 and Table 10.

TABLE 9

Example Coding performance for adaptive up-sampling filter using variance metric and DCT-II filter weights

| | All Intra Main10 Over VTM-19.2 | | |
|---|---|---|---|
| | Y | U | V |
| Class A1 | −0.02% | −0.16% | −0.09% |
| Class A2 | −0.05% | −0.06% | 0.13% |
| Class B | −0.06% | 0.07% | −0.03% |
| Class C | −0.14% | −0.14% | 0.07% |
| Class E | −0.04% | 0.34% | −0.37% |
| Overall | −0.07% | 0.01% | −0.05% |
| Class D | −0.14% | −0.02% | −0.22% |
| Class F | −0.17% | 0.62% | −0.54% |

TABLE 10

Example Coding performance for adaptive up-sampling filter using smoothness metric and DCT-II filter weights

| | All Intra Main10 Over VTM-19.2 | | |
|---|---|---|---|
| | Y | U | V |
| Class A1 | 0.01% | −0.18% | 0.03% |
| Class A2 | −0.07% | 0.21% | 0.11% |
| Class B | −0.06% | 0.06% | 0.04% |
| Class C | −0.14% | −0.14% | 0.07% |
| Class E | −0.08% | −0.12% | −0.76% |
| Overall | −0.07% | −0.03% | −0.08% |
| Class D | −0.14% | −0.02% | −0.22% |
| Class F | −0.14% | 0.33% | −0.64% |

As shown in Tables 9 and 10, the coding gain for variance and smoothness can be similar. However, the calculation of variance can take less runtime in some cases.

Although FIG. 8 illustrates an example process 800 for block-based reference sample up-sampling optimization, various changes may be made to FIG. 8. For example, while shown as a series of steps, various steps in FIG. 8 may overlap, occur in parallel, or occur any number of times.

In various embodiments of this disclosure, the down-sampling filters and up-sampling filters used can be further customized and/or optimized in various ways. For example, in some embodiments, instead of two candidates for each decimation factor/interpolation rate, n candidates for the down-sampling or up-sampling filter can be used, and a set of thresholds can be established, e.g., $th_0, th_1, \ldots, th_{n+1}$. The filter FR can be chosen when the metric f(refV) is inside [$th_k$, $th_{k+1}$).

In some embodiments, instead of designing the filters with window functions or DCT transform, a data-driven solution can be used to optimize the down-sampling filters and the up-sampling filters. For instance, the down-sampling filter and the up-sampling filter can be modeled individually for each mipSizeId, and down-sampling filters for different down-sampling factors can be modeled separately. A down-sampling filter for down-sampling factor k can be modeled as a k-tap filter. The up-sampling filters can be modeled as p-tap filters with 8 pel positions, where p=2 and p=4, for example. In some embodiments, there can be (2+4+8+16)*3=90 parameters for down-sampling filters and 8*p*2=16*p parameters for up-sampling filters, where there is no up-sampling operation for mipSizeId=0.

For instance, the electronic device 300 can log the block size (w,h), block position (x,y), reference samples (reftop, refleft), MIP mode (m), and transpose flag (t) for every MIP block. The corresponding down-sampling filter is applied to obtain reduced reference samples. After the matrix-vector multiplication is performed and the reduced prediction is obtained, the corresponding up-sampling filter is applied to obtain a full prediction P (x,y,w,h) from the reduced prediction. The difference of the original block Y(x,y,w,h) and the prediction is called a prediction residual, where better coding gain means smaller residuals.

The electronic device 300 can use the following method to convert the prediction residual to a loss function for the filter optimization. $c(x,y,w,h)=T(Y(x,y,w,h)-p(x,y,w,h))$ is the prediction residual transformed by T, where T is the two-dimensional DCT-II. The electronic device 300 uses the loss function defined on coefficients c to approximate the coding loss, $l(c)=|c|+\alpha g(\beta|c|-r)$, where g is the logistic function $g(x)=1/(1+e^{-x})$. It will be understood that other loss function to model the prediction residual can be used as well. The electronic device 300 can minimize the sum over the losses for all the blocks with the same size to search for the best down-sampling and up-sampling filters. In some embodiments, the down-sampling filter can be fixed and only the up-sampling filter is optimized, or vice versa.

In some embodiments, the optimization can be implemented in Pytorch with an ADAM optimizer with a learning rate starting at 0.0005 and with a reduce factor of $1.3^{-1}$, although other implementations are possible. In some embodiments, the blocks are padded to be the same size (e.g., 64×64). In some embodiments, the batch size is 64 and the number of epochs is fixed to be 50, but it will be understood that other batch sizes and numbers of epochs can be used. It has been found that 4-tap up-sampling filters can provide higher efficiency gains than 2-tap up-sampling filters.

An example of optimized up-sampling filters is provided in Table 11 and their coding performance is given in Table 12.

TABLE 11

Example optimized up-sampling filter weights

| mipSizeId = 1 | | mipSizeId = 2 | |
|---|---|---|---|
| Pel position | 4-tap filter coeffs. | Pel position | 4-tap filter coeffs. |
| 0 | 0, 64, 0, 0 | 0 | 0, 64, 0, 0 |
| 1/8 | 2, 54, 10, −2 | 1/8 | 5, 48, 12, −1 |

TABLE 11-continued

Example optimized up-sampling filter weights

| mipSizeId = 1 | | mipSizeId = 2 | |
|---|---|---|---|
| Pel position | 4-tap filter coeffs. | Pel position | 4-tap filter coeffs. |
| 2/8 | 0, 49, 17, −2 | 2/8 | 3, 42, 20, −1 |
| 3/8 | 0, 41, 27, −2 | 3/8 | 2, 36, 30, −2 |
| 4/8 | −1, 34, 34, −3 | 4/8 | 2, 29, 35, −2 |
| 5/8 | 0, 25, 41, −2 | 5/8 | 1, 22, 42, −1 |
| 6/8 | 0, 16, 49, −1 | 6/8 | 1, 16, 46, 1 |
| 7/8 | 1, 9, 54, 0 | 7/8 | 1, 11, 49, 3 |
| 1 | 1, 2, 58, 3 | 1 | 1, 7, 49, 7 |

TABLE 12

Example Coding performance for optimized up-sampling filters

| | All Intra Main10 Over VTM-19.2 | | |
|---|---|---|---|
| | Y | U | V |
| Class A1 | −0.13% | −0.16% | 0.02% |
| Class A2 | −0.08% | −0.03% | 0.09% |
| Class B | −0.09% | 0.07% | 0.24% |
| Class C | −0.04% | −0.09% | 0.19% |
| Class E | −0.15% | −0.09% | −0.75% |
| Overall | −0.09% | −0.05% | 0.00% |
| Class D | −0.05% | 0.27% | 0.39% |
| Class F | −0.11% | 0.30% | −0.57% |

In some embodiments, the filters can be optimized for each video resolution individually. Using the adaptive up-sampling filter, the coding performance can further be improved, for example, to 0.11% (Y), as shown in Table 13.

TABLE 13

Example Coding performance for adaptive optimized up-sampling filters for different video resolutions

| | All Intra Main10 Over VTM-19.2 | | |
|---|---|---|---|
| | Y | U | V |
| Class A1 | −0.17% | −0.30% | −0.02% |
| Class A2 | −0.09% | 0.23% | 0.00% |
| Class B | −0.10% | 0.05% | 0.26% |
| Class C | −0.05% | −0.07% | 0.18% |
| Class E | −0.15% | −0.09% | −0.75% |
| Overall | −0.11% | −0.03% | −0.02% |
| Class D | −0.07% | 0.47% | 0.57% |
| Class F | −0.11% | 0.30% | −0.46% |

In some embodiments, the optimizing of down-sampling and up-sampling filters can be combined with a MIP matrix optimization.

Figure 9:
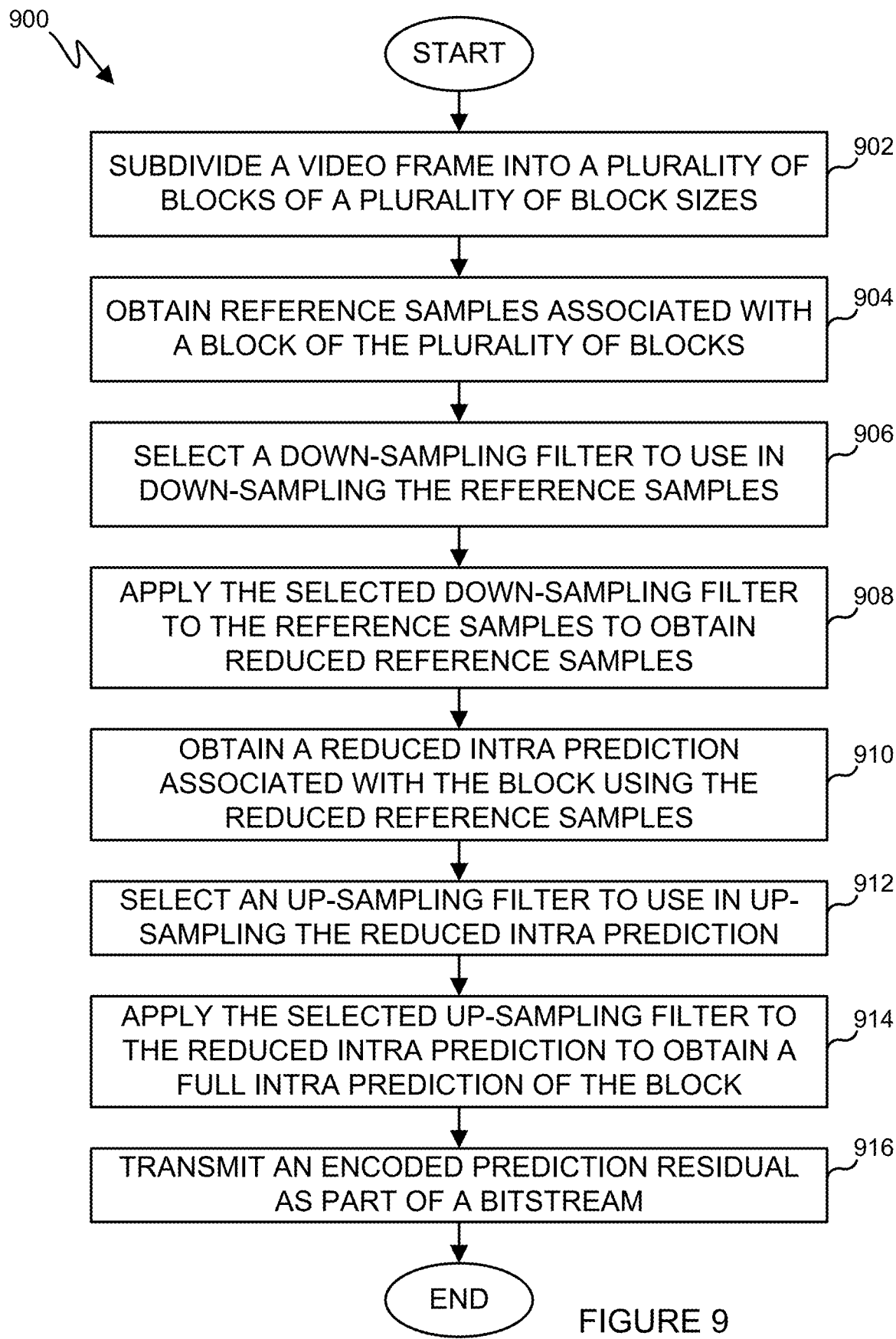
FIG. 9 illustrates an example encoding method for block-based intra prediction down-sampling and up-sampling filter selection and optimization in accordance with this disclosure.

FIG. 9 illustrates an example encoding method 900 for block-based intra prediction down-sampling and up-sampling filter selection and optimization in accordance with this disclosure. For ease of explanation, the method 900 of FIG. 9 is described as being performed using a processor of the electronic device 300 of FIG. 3. However, the method 900 may be used with any other suitable system and any other suitable electronic device.

As shown in FIG. 9, at step 902, the electronic device 300 subdivides a video frame into a plurality of blocks of a plurality of block sizes. At step 904, the electronic device 300 obtains reference samples associated with a block of the plurality of blocks, such as described with respect to FIGS. 4 and 6. At step 906, the electronic device 300 selects a down-sampling filter to use in down-sampling the reference samples. For example, as also described with respect to FIGS. 5 and 6, the down-sampling filter type can be selected based on a replacement of an averaging down-sampling operation with a window-based down-sampling filter, or the down-sampling filter to be used can be selected based on various block features, video resolution, etc.

In some embodiments, as described in this disclosure, the electronic device 300 can select the down-sampling from a set of filters based on a decimation factor. In some embodiments, as described in this disclosure, the electronic device 300 can determine whether a variation metric is above a variation threshold, and if the variation metric is above the variation threshold, select the down-sampling filter from a set of filters based on a decimation factor, or if the variation metric is below the variation threshold, select an averaging filter as the down-sampling filter.

At step 908, the electronic device 300 applies the selected down-sampling filter to the reference samples to obtain reduced reference samples (e.g., redT and redL). It will be understood that different down-sampling filter types can be used for the top reference sample and the left reference sample. At step 910, the electronic device 300 obtains a reduced intra prediction associated with the block using the reduced reference samples. For example, as described with respect to FIG. 4, the reduced reference samples can be concatenated and matrix-vector multiplication can be performed to obtain the reduced intra prediction (redPred).

At step 912, the electronic device 300 selects an up-sampling filter to use in up-sampling the reduced intra prediction. For example, as also described with respect to FIGS. 7 and 8, the down-sampling filter type can be selected based on a replacement of a linear interpolation filter for up-sampling with a DCT-based up-sampling filter, or the up-sampling filter to be used can be selected based on various block features, video resolution, etc. At step 914, the electronic device 300 applies the selected up-sampling filter to the reduced intra prediction to obtain a full intra prediction of the block. For example, as described with respect to FIGS. 4 and 8, the up-sampling filter can be applied to the reduced prediction (redPred) horizontally and vertically to obtain the full prediction (fullPred). In various embodiments described in this disclosure, the electronic device 300 can determine whether the variation metric is above a variation threshold, and, if the variation metric is above the variation threshold, select a DCTIF as the up-sampling filter, or if the variation metric is below the variation threshold, select a linear interpolation filter as the up-sampling filter. In some embodiments, the selected DCTIF filter is a discrete cosine transform type II (DCT-II) filter.

To select the down-sampling and up-sampling filters, in various embodiments, the reference samples include left reference samples and top references samples relative to the block, and the electronic device determines the variation metric for each of the left reference samples and the top reference samples, selects a first down-sampling filter for the left reference samples and a second down-sampling filter for the top reference samples, and selects a first up-sampling filter for the left reference samples and a second up-sampling filter for the top reference samples.

For instance, as described with respect to FIG. 6, in some cases a window-based filter could be used for both the top reference sample and the left reference sample, an averaging operation could be used for both the top reference sample and the left reference sample, an averaging operation could be used for the top reference sample and a window-based filter could be used for the left reference sample, or a window-based filter could be used for the top reference sample and an averaging operation could be used for the left reference sample. Additionally, it will be understood that different up-sampling filter types can be used for up-sampling horizontally and up-sampling vertically. As described with respect to FIG. 8, for example, in some cases a DCT-based filter could be used for both horizontal and vertical up-sampling, a linear interpolation filter could be used for both horizontal and vertical up-sampling, a linear interpolation filter could be used for horizontal up-sampling and a DCT-based filter could be used for vertical up-sampling, or a DCT-based filter could be used for horizontal up-sampling and a linear interpolation filter could be used for vertical up-sampling. In various embodiments, at least one of the down-sampling filter and the up-sampling filter is based on block features including a variation metric of the reference samples.

In some embodiments, at least one of the down-sampling filter and the up-sampling filter are optimized using a loss function based on a prediction residual, where the prediction residual is a difference between an original block and a predicted block, and where a sum of losses, determined using the loss function, for a plurality of blocks with a same size as a block size of the block of the video frame, is minimized to obtain the at least one of the down-sampling and the up-sampling filter.

At step 914, the electronic device 300 transmits an encoded prediction residual as part of a bitstream, where the prediction residual is a difference between an original block and a predicted block. The electronic device 300 can compress and transmit the output bitstream to an external device or to a storage on the electronic device 300. In various embodiments, the prediction residual can be used by a decoding device in performing intra prediction.

Although FIG. 9 illustrates one example encoding method 900 for block-based intra prediction down-sampling and up-sampling filter selection and optimization, various changes may be made to FIG. 9. For example, while shown as a series of steps, various steps in FIG. 9 may overlap, occur in parallel, or occur any number of times.

Figure 10:
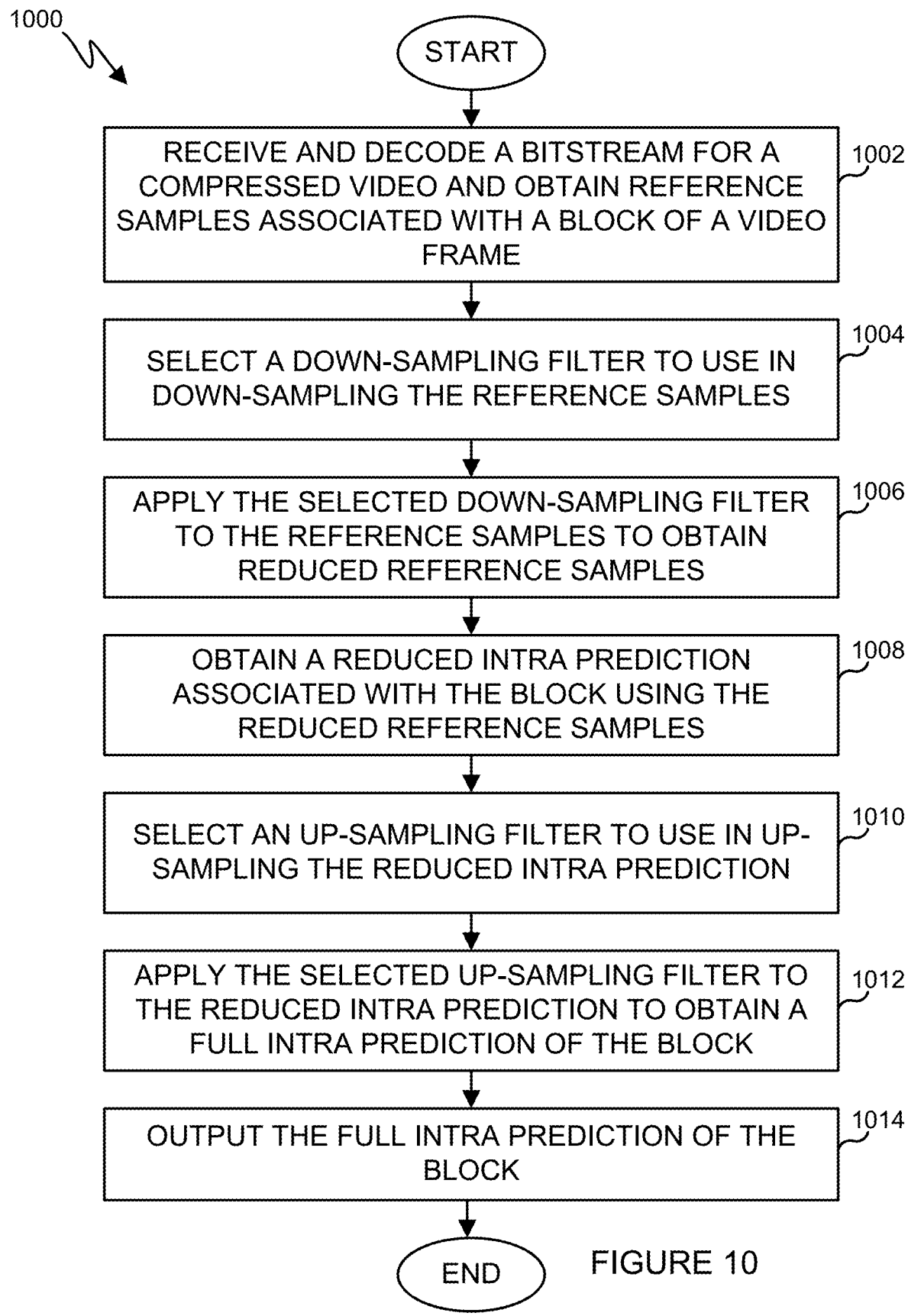
FIG. 10 illustrates an example decoding method for block-based intra prediction down-sampling and up-sampling filter selection and optimization in accordance with this disclosure.

FIG. 10 illustrates an example decoding method 1000 for block-based intra prediction down-sampling and up-sampling filter selection and optimization in accordance with this disclosure. For ease of explanation, the method 1000 of FIG. 10 is described as being performed using a processor of the electronic device 300 of FIG. 3. However, the method 1000 may be used with any other suitable system and any other suitable electronic device.

As shown in FIG. 10, at step 1002, the electronic device 300 receives a bitstream for a compressed video and the processor of the electronic device 300 decodes the bitstream for the compressed video. As part of the decoding of the bitstream, the electronic device 300 can obtain reference samples associated with a block of a video frame. At step 1004, the electronic device 300 selects a down-sampling filter to use in down-sampling the reference samples. For example, as also described with respect to FIGS. 5 and 6, the down-sampling filter type can be selected based on a replacement of an averaging down-sampling operation with a window-based down-sampling filter, or the down-sampling filter to be used can be selected based on various block features, video resolution, etc.

In some embodiments, as described in this disclosure, the electronic device 300 can select the down-sampling from a set of filters based on a decimation factor. In some embodiments, as described in this disclosure, the electronic device 300 can determine whether a variation metric is above a variation threshold, and if the variation metric is above the variation threshold, select the down-sampling filter from a set of filters based on a decimation factor, or if the variation metric is below the variation threshold, select an averaging filter as the down-sampling filter.

At step 1006, the electronic device 300 applies the selected down-sampling filter to the reference samples to obtain reduced reference samples (e.g., redT and redL). It will be understood that different down-sampling filter types can be used for the top reference sample and the left reference sample. At step 1008, the electronic device 300 obtains a reduced intra prediction associated with the block using the reduced reference samples. For example, as described with respect to FIG. 4, the reduced reference samples can be concatenated and matrix-vector multiplication can be performed to obtain the reduced intra prediction (redPred).

At step 1010, the electronic device 300 selects an up-sampling filter to use in up-sampling the reduced intra prediction. For example, as also described with respect to FIGS. 7 and 8, the down-sampling filter type can be selected based on a replacement of a linear interpolation filter for up-sampling with a DCT-based up-sampling filter, or the up-sampling filter to be used can be selected based on various block features, video resolution, etc. At step 1012, the electronic device 300 applies the selected up-sampling filter to the reduced intra prediction to obtain a full intra prediction of the block. For example, as described with respect to FIGS. 4 and 8, the up-sampling filter can be applied to the reduced prediction (redPred) horizontally and vertically to obtain the full prediction (fullPred). In various embodiments described in this disclosure, the electronic device 300 can determine whether the variation metric is above a variation threshold, and, if the variation metric is above the variation threshold, select a DCTIF as the up-sampling filter, or if the variation metric is below the variation threshold, select a linear interpolation filter as the up-sampling filter. In some embodiments, the selected DCTIF filter is a discrete cosine transform type II (DCT-II) filter.

To select the down-sampling and up-sampling filters, in various embodiments, the reference samples include left reference samples and top references samples relative to the block, and the electronic device determines the variation metric for each of the left reference samples and the top reference samples, selects a first down-sampling filter for the left reference samples and a second down-sampling filter for the top reference samples, and selects a first up-sampling filter for the left reference samples and a second up-sampling filter for the top reference samples.

For instance, as described with respect to FIG. 6, in some cases a window-based filter could be used for both the top reference sample and the left reference sample, an averaging operation could be used for both the top reference sample and the left reference sample, an averaging operation could be used for the top reference sample and a window-based filter could be used for the left reference sample, or a window-based filter could be used for the top reference sample and an averaging operation could be used for the left reference sample. Additionally, it will be understood that different up-sampling filter types can be used for up-sampling horizontally and up-sampling vertically. As described with respect to FIG. 8, for example, in some cases a DCT-based filter could be used for both horizontal and vertical up-sampling, a linear interpolation filter could be used for both horizontal and vertical up-sampling, a linear interpolation filter could be used for horizontal up-sampling and a DCT-based filter could be used for vertical up-sampling, or a DCT-based filter could be used for horizontal up-sampling and a linear interpolation filter could be used for vertical up-sampling. In various embodiments, at least one of the down-sampling filter and the up-sampling filter is based on block features including a variation metric of the reference samples.

In some embodiments, at least one of the down-sampling filter and the up-sampling filter are optimized using a loss function based on a prediction residual, where the prediction residual is a difference between an original block and a predicted block, and where a sum of losses, determined using the loss function, for a plurality of blocks with a same size as a block size of the block of the video frame, is minimized to obtain the at least one of the down-sampling and the up-sampling filter.

At step 1014, the electronic device 300 outputs the full intra prediction of the block. During decoding of the bitstream and using the full intra prediction, the processor of the electronic device 300 can further instruct a display of at least one image of a reconstructed video.

Although FIG. 10 illustrates one example decoding method 1000 for block-based intra prediction down-sampling and up-sampling filter selection and optimization, various changes may be made to FIG. 10. For example, while shown as a series of steps, various steps in FIG. 10 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
   a communication interface configured to receive a bitstream for a compressed video; and
   a processor operably coupled to the communication interface, the processor configured to:
   decode the bitstream for the compressed video and obtain reference samples associated with a block of a video frame;
   select a down-sampling filter to use in down-sampling the reference samples;
   apply the selected down-sampling filter to the reference samples to obtain reduced reference samples;
   obtain a reduced intra prediction associated with the block using the reduced reference samples;
   select an up-sampling filter to use in up-sampling the reduced intra prediction,
   wherein a sum of losses, determined using a loss function, for a plurality of blocks with a same size as a block size of the block of the video frame, is minimized to obtain the at least one of the down-sampling and the up-sampling filter;

apply the selected up-sampling filter to the reduced intra prediction to obtain a full intra prediction of the block; and output the full intra prediction of the block.

2. The apparatus of claim 1, wherein, to select the down-sampling filter, the processor is further configured to select the down-sampling filter from a set of filters based on a decimation factor.

3. The apparatus of claim 1, wherein the selection of at least one of the down-sampling filter and the up-sampling filter is based on block features including a variation metric of the reference samples.

4. The apparatus of claim 3, wherein, to select the down-sampling filter, the processor is further configured to:
determine whether the variation metric is above a variation threshold; and
if the variation metric is above the variation threshold, select the down-sampling filter from a set of filters based on a decimation factor, or
if the variation metric is below the variation threshold, select an averaging filter as the down-sampling filter.

5. The apparatus of claim 3, wherein, to select the up-sampling filter, the processor is further configured to:
determine whether the variation metric is above a variation threshold; and
if the variation metric is above the variation threshold, select a discrete cosine transform interpolation filter (DCTIF) as the up-sampling filter, or
if the variation metric is below the variation threshold, select a linear interpolation filter as the up-sampling filter.

6. The apparatus of claim 5, wherein the selected DCTIF filter is a discrete cosine transform type II filter.

7. The apparatus of claim 3, wherein the reference samples include left reference samples and top references samples relative to the block, and wherein the processor is further configured to:
determine the variation metric for each of the left reference samples and the top reference samples;
select a first down-sampling filter for the left reference samples and a second down-sampling filter for the top reference samples; and
select a first up-sampling filter for the left reference samples and a second up-sampling filter for the top reference samples.

8. The apparatus of claim 1, wherein the at least one of the down-sampling filter and the up-sampling filter are optimized using the loss function, wherein the loss function is based on a prediction residual, and wherein the prediction residual is a difference between an original block and a predicted block.

9. A method comprising:
receiving and decoding a bitstream for a compressed video;
obtaining reference samples associated with a block of a video frame;
selecting a down-sampling filter to use in down-sampling the reference samples;
applying the selected down-sampling filter to the reference samples to obtain reduced reference samples;
obtaining a reduced intra prediction associated with the block using the reduced reference samples;
selecting an up-sampling filter to use in up-sampling the reduced intra prediction;
wherein a sum of losses, determined using a loss function, for a plurality of blocks with a same size as a block size of the block of the video frame, is minimized to obtain the at least one of the down-sampling and the up-sampling filter;
applying the selected up-sampling filter to the reduced intra prediction to obtain a full intra prediction of the block; and
outputting the full intra prediction of the block.

10. The method of claim 9, wherein selecting the down-sampling filter includes selecting the down-sampling filter from a set of filters based on a decimation factor.

11. The method of claim 9, wherein the selection of at least one of the down-sampling filter and the up-sampling filter is based on block features including a variation metric of the reference samples.

12. The method of claim 11, wherein selecting the down-sampling filter includes:
determining whether the variation metric is above a variation threshold; and
if the variation metric is above the variation threshold, selecting the down-sampling filter from a set of filters based on a decimation factor, or
if the variation metric is below the variation threshold, selecting an averaging filter as the down-sampling filter.

13. The method of claim 11, wherein selecting the up-sampling filter includes:
determining whether the variation metric is above a variation threshold; and
if the variation metric is above the variation threshold, selecting a discrete cosine transform interpolation filter (DCTIF) as the up-sampling filter, or
if the variation metric is below the variation threshold, selecting a linear interpolation filter as the up-sampling filter.

14. The method of claim 13, wherein the selected DCTIF filter is a discrete cosine transform type II filter.

15. The method of claim 11, wherein the reference samples include left reference samples and top references samples relative to the block, and wherein the method further comprises:
determining the variation metric for each of the left reference samples and the top reference samples;
selecting a first down-sampling filter for the left reference samples and a second down-sampling filter for the top reference samples; and
selecting a first up-sampling filter for the left reference samples and a second up-sampling filter for the top reference samples.

16. The method of claim 9, wherein the at least one of the down-sampling filter and the up-sampling filter are optimized using the loss function, wherein the loss function is based on a prediction residual, and wherein the prediction residual is a difference between an original block and a predicted block.

17. An apparatus comprising:
a communication interface; and
a processor operably coupled to the communication interface, the processor configured to:
subdivide a video frame into a plurality of blocks of a plurality of block sizes;
obtain reference samples associated with a block of the plurality of blocks;
select a down-sampling filter to use in down-sampling the reference samples;
apply the selected down-sampling filter to the reference samples to obtain reduced reference samples;

obtain a reduced intra prediction associated with the block using the reduced reference samples;

select an up-sampling filter to use in up-sampling the reduced intra prediction, wherein a sum of losses, determined using the loss function, of multiple blocks with a same size as a block size of the block, is minimized to obtain the at least one of the down-sampling filter and the up-sampling filter;

apply the selected up-sampling filter to the reduced intra prediction to obtain a full intra prediction of the block; and encode and transmit the prediction residual as part of a bitstream, wherein the prediction residual is a difference between an original block and a predicted block.

18. The apparatus of claim 17, wherein the at least one of the down-sampling filter and the up-sampling filter are optimized using the loss function, wherein the loss function is based on the prediction residual.

19. The apparatus of claim 17, wherein, to select the down-sampling filter, the processor is further configured to:

determine whether a variation metric of the reference samples is above a variation threshold; and if the variation metric is above the variation threshold, select the down-sampling filter from a set of filters based on a decimation factor, or if the variation metric is below the variation threshold, select an averaging filter as the down-sampling filter.

20. The apparatus of claim 17, wherein, to select the up-sampling filter, the processor is further configured to:

determine whether a variation metric is above a variation threshold; and if the variation metric is above the variation threshold, select a discrete cosine transform interpolation filter (DCTIF) as the up-sampling filter, or if the variation metric is below the variation threshold, select a linear interpolation filter as the up-sampling filter.

* * * * *